United States Patent

Vaid et al.

[11] Patent Number: 6,047,322
[45] Date of Patent: Apr. 4, 2000

[54] METHOD AND APPARATUS FOR QUALITY OF SERVICE MANAGEMENT

[75] Inventors: Aseem Vaid, San Jose; Sanjay Sawhney, Santa Clara; Anand K. Antur, San Jose; Naveen S. Bisht, Campbell, all of Calif.

[73] Assignee: Ukiah Software, Inc., Campbell, Calif.

[21] Appl. No.: 08/999,096

[22] Filed: Dec. 29, 1997

Related U.S. Application Data

[60] Provisional application No. 60/047,752, May 27, 1997.

[51] Int. Cl.[7] .............................. G06F 11/34; G06F 13/36; H04L 12/26
[52] U.S. Cl. .......................... 709/224; 709/225; 714/38; 714/39; 370/449
[58] Field of Search .................................... 709/221, 228, 709/203, 230, 233, 224, 225; 707/10; 714/38, 39; 340/825.52; 370/445, 449, 231; 712/1

[56] References Cited

U.S. PATENT DOCUMENTS

| | | | |
|---|---|---|---|
| 5,227,778 | 7/1993 | Vacon et al. | 340/825.52 |
| 5,436,891 | 7/1995 | Grossman et al. | 370/231 |
| 5,548,726 | 8/1996 | Pettus | 709/221 |

*Primary Examiner*—Daniel H. Pan
*Attorney, Agent, or Firm*—Townsend and Townsend and Crew LLP

[57] ABSTRACT

A novel method for a network of computers to improve quality of services using a combination of a bandwidth management tool in a firewall. The method includes the steps of providing a network directory services server providing network directory services to a plurality of network servers, each of the plurality of network servers coupled to one of the plurality of network quality of service devices, implementing a quality of service policy for the plurality of network quality of service devices on the network directory services server, and using the network directory services to provide configuration information for the plurality of network quality of service devices, in response to the quality of service policy.

20 Claims, 11 Drawing Sheets

SCHEMATIC OF QOS SYSTEM DEPLOYED FOR INTERNET ACCESS
AND A PRIVATE WAN

LIKELY TRAFFIC CLASSES AND POLICIES

| Traffic class | Base class (Traffic type) []=Application dependent | Applied Policy Y=Always N=Rarely P=Policy/Application dependent | | Exception Control AC=Admission Control DP=Drop packets TS=Throttle source LS=Load Share | | | |
|---|---|---|---|---|---|---|---|
| | | Rate | Latency | AC | DP | TS | LS |
| HTTP | Interactive, [All] | Y | P | P | N | P | P |
| HTML | Interactive | Y | P | P | N | P | P |
| GIF, JPEG | Bandwidth-intense, [Interactive] | Y | P | P | Y | P | P |
| RealAudio | Real-Time, [Interactive] | Y | Y | Y | Y | N | Y |
| Realtime Video | Bandwidth-intense, Real-Time, [Interactive] | Y | Y | Y | Y | N | Y |
| SMTP, NNTP | None | Y | N | N | N | N | N |
| FTP | Bandwidth-intense, [Interactive] | Y | N | P | N | Y | P |
| TELNET | Interactive | N | Y | N | N | N | N |
| DNS | Interactive | N | Y | N | N | N | N |
| RPC | [Interactive] | P | Y | P | N | P | N |
| Novell NCP | [All] | P | P | P | P | P | P |

*FIG. 4*

STATE TRANSITION FOR TCP DATA FLOW REGULATOR

IMPLEMENTATION ARCHITECTURE – Software Stack and Data Flow

Pure IPX Environmental Configuration

Pure IP Environmental Configuration

Mixed Environment Configuration

NetRoad FireWALL as NDS Object

Configuration Object Within NetRoad FireWALL

Configuration Object Within NetRoad FireWALL

METHOD AND APPARATUS FOR QUALITY OF SERVICE MANAGEMENT

CROSS-REFERENCE TO RELATED APPLICATIONS

The present application claims priority to pending application Ser. No. 60/047,752, entitled: Method and Apparatus for Configuring and Managing Firewalls, filed May 27, 1997, attorney docket no. 18430-000200. The application is herein incorporated by reference for all purposes.

BACKGROUND OF THE INVENTION

The present invention relates to communication or telecommunication. More particularly, the present invention provides a technique, including a method and system, for monitoring and allocating bandwidth on a telecommunication network at a firewall access point. As merely an example, the present invention is implemented on a wide area network of computers or workstations such as the Internet. But it would be recognized that the present invention has a much broader range of applicability including local area networks, a combination of wide and local area networks, and the like.

Telecommunication techniques have been around for numerous years. In the early days, people communicated to each other over long distances using "smoke signals." Smoke signals were generally used to transfer visual information from one geographical location to be observed at another geographical location. Since smoke signals could only be seen over a limited range of geographical distances, they were soon replaced by a communication technique known as telegraph. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the late 1800's to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network. These computers or workstations coupled to each other can transmit many types of information from one location to another location. This information can be in the form of voice, video, and data. Information transmitted over the Internet or Internet "traffic" has increased dramatically in recent years. In fact, the increased traffic has caused congestion, which leads to problems in responsiveness and throughput. This congestion is similar to the congestion of automobiles on a freeway, such as those in Silicon Valley from the recent "boom" in high technology companies, including companies specializing in telecommunication. As a result, individual users, businesses, and others have been spending more time waiting for information, and less time on productive activities. For example, a typical user of the Internet may spend a great deal of time attempting to view selected sites, which are commonly referred to as "Websites," on the Internet. Additionally, information being sent from one site to another through electronic mail, which is termed "e-mail," may not reach its destination in a timely or adequate manner. In effect, quality of service of the Internet has decreased to the point where some messages are being read at some time significantly beyond the time the messages were sent.

Quality of Service is often measured by responsiveness, including the amount of time spent waiting for images, texts, and other data to be transferred, and by throughput of data across the Internet, and the like. Other aspects may be application specific, for example, jitter, quality of playback, quality of data transferred across the Internet, and the like. Three main sources of data latency include: the lack of bandwidth at the user (receiving) end, the general congestion of Internet, and the lack of bandwidth at the source (sending) end.

A solution to decreasing data latency includes increasing the bandwidth of the user. This is typically accomplished by upgrading the network link, for example by upgrading a modem or network connection. For example, upgrading to X2 modems, 56K modems, ADSL or DMT modems, ISDN service and modems, cable TV service and modems, and the like. Drawbacks to these solutions include that they typically require additional network service; they also require additional hardware and/or software, and further they require both the sender and receiver to both agree on using the same hardware and/or software. Although one user may have a much faster line or faster modem, another user may still user the same 1200 kbaud modem. So, the speed at which information moves from one location to another location is often predicated on the slowest information which is being transferred. Accordingly, users of faster technology are basically going nowhere, or "running" nowhere fast.

A further problem with quality of service management for typical business users is that multiple server platforms have to be supported by system administrators. Rumors of the death of NetWare as a network server platform have been exaggerated. Although WindowsNT is gaining market share, there are in excess of three million NetWare servers (and 55 million NetWare clients) currently in use. Mixed networks at both the protocol and operating system platform level, therefore, will be around for years to come as well as the need to improve use of the Internet and its rich information resources. From the above, it is seen that what is needed are quality of service and bandwidth management tools that have the ability to operate in hybrid network environments.

SUMMARY OF THE INVENTION

The present invention relates to a technique including a method and system for providing more quality to telecommunication services. More particularly, the present invention relates to quality of service management in a mixed network environment. More specifically, the invention relates to combining computer network firewalls for implementing quality of service management, which can also be referred to as "bandwidth" management.

In a specific embodiment, the present invention provides a novel method for configuring a plurality of network quality of service devices. The method includes the step of providing a network directory services server providing network directory services to a plurality of network servers, each of the plurality of network servers coupled to one of the plurality of network quality of service devices. The method also includes the step of implementing a quality of service policy for the plurality of network quality of service devices on the network directory services server. The step of using the network directory services to provide configuration information for the plurality of network quality of service devices, in response to the quality of service policy is also provided.

In an alternative embodiment, the present invention provides an easy to use method for bandwidth management in a plurality of networks. The method includes the steps of providing a central network server providing directory services to the plurality of networks, and configuring bandwidth management features for the plurality of network within the central network server via a remote client. The method also includes the steps of using the directory services to provide each of the plurality of network with the bandwidth management features.

Numerous advantages are achieved by way of the present invention over pre-existing or conventional techniques. In a specific embodiment, the present invention provides a single point or a single region to manage telecommunication traffic including directory services and bandwidth management. Additionally, in some, if not all embodiments, the present invention can be implemented at a single point of access such as a computer terminal or firewall, for example. Furthermore, the present invention can be predominately software based and can be implemented into a pre-existing system by way of a relatively simple installation process. These and other advantages are described throughout the present specification, and more particularly below.

Further understanding of the nature and advantages of the invention may be realized by reference to the remaining portions of the specification, drawings, and attached documents

BRIEF DESCRIPTION OF THE DRAWINGS

FIG. 4 illustrates a table summarizing some basic TCP/IP traffic classes and typical policies that are applied to them;

DESCRIPTION OF SPECIFIC EMBODIMENTS

Figure 1:
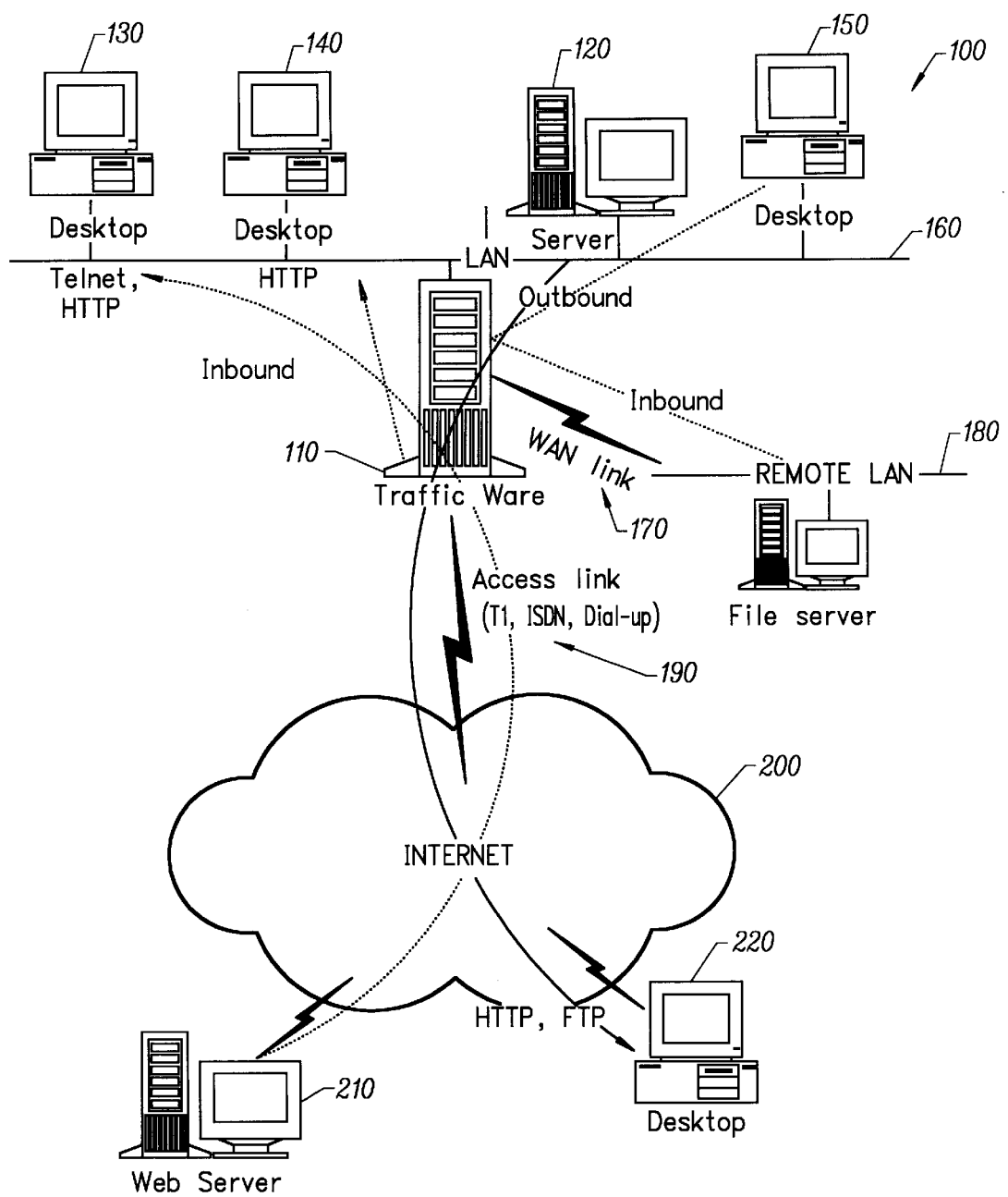
FIG. 1 illustrates a typical system including a preferred embodiment of the present invention.

An embodiment of the present provides integrated network service policies for firewall platforms. Specifically, the present invention provides network or firewall administrators with the ability to implement policy-based schema for security and resource management on firewall platforms. In a specific embodiment, resource management includes Network Quality of Service (QoS) or "bandwidth" management techniques for network servers administered utilizing Directory Service services.

Network QoS is managed by managing the resources that serve network application traffic, for example. This typically includes the following resources: link bandwidth, application server bandwidth (CPU) and buffer space on generally all nodes (end-points, routers and gateways). Typically, data through-put is limited by the speed of Internet access links and by the server CPU Capacity, and response time is determined by the number of hops in a route, physical length of the route, and extent of congestion in the route. There are various other factors that may affect QoS, such as the behavior of TCP/IP, severe congestion anywhere in the route, prioritization of traffic along the route, etc. To a network administrator, embodiments of the present invention provide discrimination of different traffic types and provide methods for enforcement of traffic flow by management to the above resources.

DEFINITIONS

Firewall: A type of security mechanism for controlling access between a private trusted network and an untrusted outside network (which might be the public Internet or some other part of the corporate network within an intranet). It typically includes software running on general purpose or specialized hardware.

LDAP: Lightweight Directory Access Protocol, a proposed directory protocol standard.

DS: Directory Services are global, distributed information databases that provide access to network resources, regardless of physical location. Such directory services are preferably Novell Directory Services, Microsoft's Active Directory Services (AD), LDAP and other directory services provide central points of administration for entire networks of networks. DS typically maintain information about every resource on the network, including users, groups, printers, volumes, and other devices. This information is typically stored on a single logical database, thus, instead of logging onto many individual file servers, users and network administrators log onto the network preferably only once.

Trusted network: Users on this network are, by default, deemed to be trustworthy. Users may be physically on a common network, or linked together via a virtual private network (VPN).

DMZ: The 'Demilitarized Zone' lies outside the perimeter defenses provided by the firewall but contains systems that are owned by a private organization. Common examples would be Web servers and anonymous ftp servers providing information to Internet users.

Untrusted network: These are outside networks of various kinds, among the many thousands of networks connected to the Internet, or even untrusted networks that may be part of other departments or divisions within an organization.

I. SYSTEM OVERVIEW

FIG. 1 illustrates a typical system 100 including an embodiment of the present invention. The system 100 is merely an illustration and should not limit the scope of the claims herein. One of ordinary skill in the art would recognize other variations, modifications, and alternatives. The present invention is embodied as an TrafficWare™ firewall server 110 from Ukiah Software, Inc, but can be others. System 100 typically includes a file server 120, and a plurality of computers 130–150, coupled to a local area network (LAN) 160, and other elements. Firewall server 110 includes a typical connection to a wide area network (WAN) 170 and to a remote LAN 180 (such as an Intranet) and a typical network connection 190 to the Internet 200. Attached to Internet 200 are Web servers 210 and other computers 220.

As illustrated, computers such as computer 130, 140, and 210 communicate using any one or multiple application layer protocols such as Telnet, file transfer protocol (FTP), Hypertext transmission protocol (HTTP), and the like. Further, communication across WAN 170 and across network connection 190 implements transport layer protocols such as transmission control protocol (TCP), universal data protocol (UDP), and the like. LAN 160 and LAN 180 are preferably based upon network protocols such as Internet protocol (IP), IPX from Novell, AppleTalk, and the like. As shown in FIG. 1, network connection 190 may be accomplished using T1, ISDN, Dial-up, and other hardware connections. Computers 120–150 and 210–220 may be any suitable make or model of computer that can be coupled to a network. The system can also include a variety of other elements such as bridges, routers, and the like.

Figure 2:
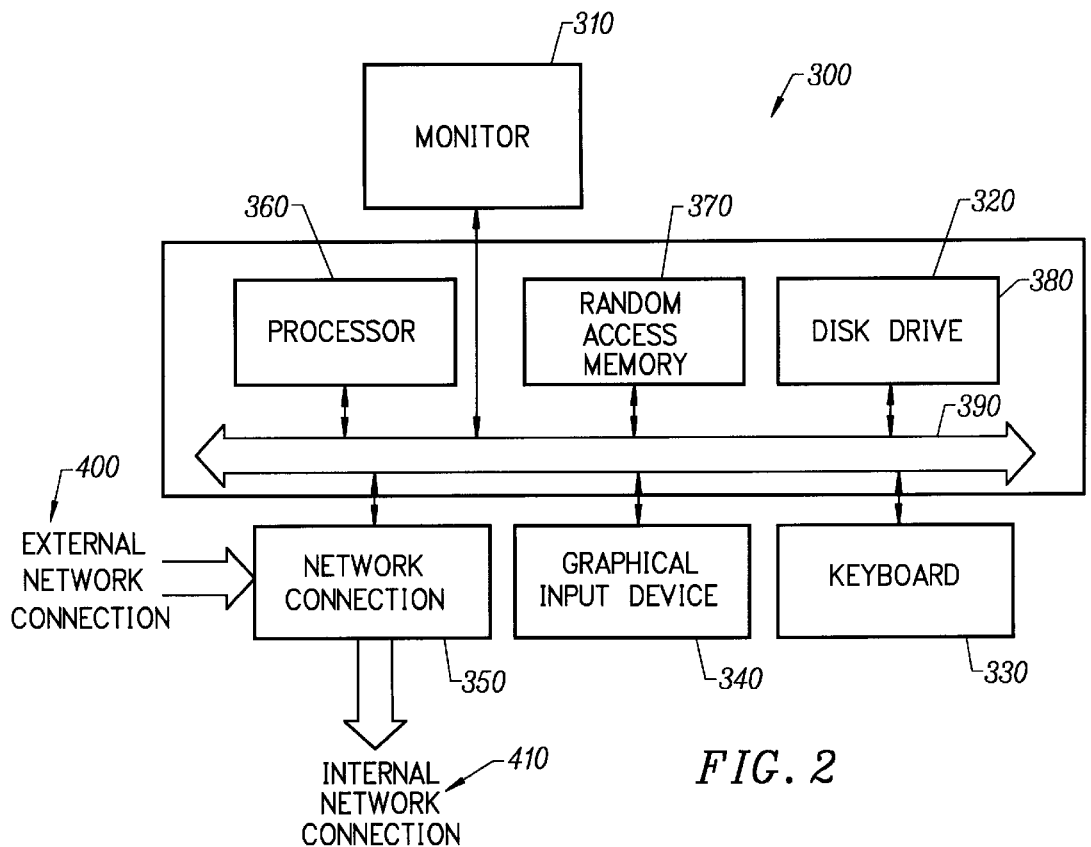
FIG. 2 is a block diagram of a firewall server according to a preferred embodiment of the present invention.

FIG. 2 is a simplified block diagram of a firewall server 300 according to an embodiment of the present invention. The block diagram is merely an illustration and should not limit the scope of the claims herein. Firewall server 300 typically includes, among other elements, a monitor 310, a computer 320, a keyboard 330, a graphical input device 340, and a network interface 350. Computer 320 includes familiar computer components such as a processor 360, and memory storage devices, such as a random access memory (RAM) 370, a disk drive 380, and a system bus 390 interconnecting the above components. A external network connection 400 and an internal network connection 410 are coupled to network interface 350.

A mouse is but one example of graphical input device 340, also known as a pointing device, a trackball is another. RAM 370 and disk drive 380 are examples of tangible media for storage of computer programs such as embodiments of the herein described invention. Other types of tangible media include floppy disks, removable hard disks, optical storage media such as CD-ROMS and bar codes, semiconductor memories such as flash memories, ASICs, read-only-memories (ROMS), battery-backed volatile memories, and the like. External network connection 400 typically provides access to external networks such as LAN 180 or Internet 200, as described in FIG. 1. Internal network connection 410 typically provides access to internal networks such as LAN 160.

In a specific embodiment, firewall server 300 includes a IBM PC compatible computer having a '586-class based microprocessor, such a Pentium™ from Intel Corporation, running WindowsNT™ from Microsoft Corporation, and TrafficWare™ software from Ukiah Software, Inc. Network interface 350 is preferably embodied as a hardware firewall server also from Ukiah Software, Inc., but can be others.

FIG. 2 is representative of but one type of system for embodying the present invention. It will be readily apparent to one of ordinary skill in the art that many system types and software configurations are suitable for use in conjunction with present invention. The present invention can be in the form of software in one embodiment. Alternatively, the present invention can be a combination of hardware and software, which can be further combined or even separated. Of course, the particular type of system used in the present invention depends highly upon the application.

II. OUTBOUND CONTROL

1. Traffic Classes

An embodiment of the present invention discriminates between traffic classes or traffic types. For example, between application/protocol (e.g., HTTP, SMTP, FTP, Telnet), datatype (e.g., MIME type, HTML, JPEG, RealAudio, .WAV, .MOV), source/destination identifier (e.g., IP address, user name, domain, URQ), type (real-time, interactive, throughput-intense), direction (inbound/outbound), and the like. Further traffic classes are based upon specifics user (e.g. President, Shipping Clerk, etc), business group (e.g. Sales, Engineering, Accounting, etc.), priority (e.g. user-determined priority levels), direction (e.g. inbound, outbound, customer, guest, etc.).

Figure 3:
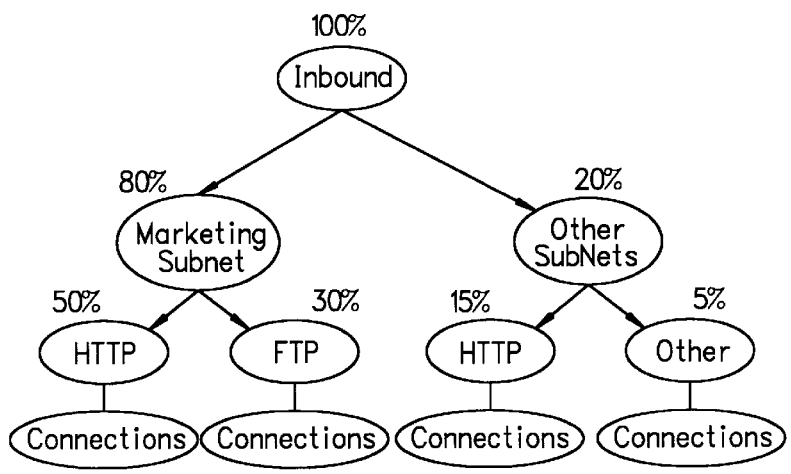
FIG. 3 illustrates an example of a hierarchical model for determining bandwidth sharing.

FIG. 3 illustrates an example of a hierarchical model for determining bandwidth sharing. This model is merely an illustration and should not limit the scope of the claims herein. As illustrated in FIG. 3, a hierarchical model is represented as a tree, with the root representing the total available bandwidth, each branch node representing aggregated traffic (meta-traffic classes), and the leaves representing individual connections (traffic classes). This model gives the user flexibility in defining and implementing a service policy or multiple service policies. For example, the network traffic is first divided in different ways and then the specific policy refined from a top down approach or amalgamated from a bottom up approach. This model also provides the user with different methods for different traffic classes since it abstracts the policy definition from the enforcement or implementation.

The user typically has competing factors to consider when determining a network QoS policy, including bandwidth "guarantees", latency "guarantees", and exception control. It should be understood "guarantees" refer to best efforts of the system to provide service, and does not in any way imply an absolute guarantee of service. For example, obviously no service can be provided or guaranteed if the network connection is inoperative, if the Internet Service Provider (ISP) has hardware or software glitches, or there is a general Internet crash.

A first factor is bandwidth guarantee, or data throughput guarantee, and how excess bandwidth is shared. For traffic classes that have data intensive requirements this is an important criteria. Typically, the user initially determines what are the minimum bandwidth guarantees that are given for different traffic classes or for connections relying on data from the different traffic classes, before determining a policy. As result of the policy, the system monitors the actual bandwidth provided to different classes, and preferably if bandwidth is critically low, the system attempts to provide at least the minimum bandwidth to the different traffic classes.

Typically, the user also initially determines how excess bandwidth is allocated. In a hierarchical model, the user provides bandwidth sharing by classes 'passing up' or 'receiving' unused bandwidth via their 'parents'. As a result, closer siblings (traffic classes) typically are able to share more bandwidth than distant traffic classes. Alternatively, the user may decide that all leaf classes are allowed to utilize excess bandwidth simply based on their priority.

A second factor is latency guarantees, or response time guarantees. For traffic classes that are sensitive to delays this is an important criteria. Typically latency is determined by the end-end route rather than the local network or any single gateway. The user typically first determines what are the maximum latency guarantees that are given for different traffic classes, before determining a policy. In response to the policy, the system monitors the bandwidth provided to different classes and if a particular traffic class requires a quicker response, the system attempts to provide more bandwidth for that traffic class. This monitoring occurs preferably when the network is idle or when the network is congested.

A third factor is exception control. The system preferably implements exception control when the bandwidth link capacity is being exceeded (congestion) or when a traffic class is attempting to exceed it's allotted capacity. Initially, the user typically determines what actions to perform when there are exceptions, some actions include: admission control (e.g., deny new requests), service degradation (e.g., dropping packets), sources throttling, traffic redirection (load sharing), and the like. Exception control is preferably a function of traffic type and policy. For example, the user may determine that real-time video requires a steady bit-rate and thus requires admission control as an exception policy when the bandwidth is low, and the user may determine that bulk file download services (which are weakly interactive) may accommodate some new requests thus instruct the system to throttle the download sources when the bandwidth is low.

The user is preferably provided with three properties: bandwidth intensive, real-time and/or interactive, which are useful in describing meaningful policies for the different traffic classes. Bandwidth-intense traffic classes typically require relatively large transmission rates (>50 kbps) for each connection over short or long intervals to maintain reasonable quality. Interactive classes typically require a low latency for all packets to maintain a good response time. Real-time classes typically require a very steady rate of data delivery (high or low) and generally also low latency. These three properties or combinations of them can also be thought of as describing generic (base) classes of traffic.

FIG. 4 illustrates a table summarizing some basic TCP/IP traffic classes and typical policies that are applied to them. Traffic classes such as HTTP, HTML, GIF, JPEG, RealAudio, Realtime Video, SMTP, NNTP, FTP, TELNET, DNS, RPC, Novell NCP are shown. To these classes, a base class is given. Applied policy and exception control are also provided, for example. Other combinations or assignments of the above policies may be made in alternative embodiments of the present invention. Further, in FIG. 4, 'P' represents dependence upon a specific policy implemented by the user.

2. Packet Scheduling

The system allocates output bandwidth per traffic class preferably by using a class of scheduling methods referred to as fair queuing algorithms at the firewall. These algorithms model traffic as weighted flows and attempt to ensure that service is given to all flows (traffic classes) in proportion to their assigned minimum bandwidth. Service typically occurs in a round robin fashion while monitoring the maximum delays. The system preferably combines such methods with priority based schedulers in order to provide latency guarantees. These types of outbound flows systems typically apply localized control over all time intervals, are generally efficient to implement, provide good link utilization, and do not depend on protocol or connection semantics.

Outbound flow control as described above is preferably combined with TCP/IP rate control, described below.

III. SOURCE CONTROL

In an embodiment of the present invention, rate control policies are specified in the form of a bandwidth allocation hierarchy, as described above, that defines aggregates of traffic according to user-specified parameters (e.g., application type, MIME type or source/destination ID). Further, classes are either guaranteed or best-effort.

As described above, inbound flows may have guaranteed classes that include a minimum reserved rate per connection and preferably have limits on the total bandwidth used or number of simultaneous guaranteed connections. Preferably, the remainder of the bandwidth, including any excess from the guaranteed classes, is dynamically allocated to 'best-effort' classes, and new best-effort connections. The specific allocation and policy are user definable. In the preferred embodiment, classes that flow above their rate limits are subject to rate control preferably if there is demand from siblings, either in the form of new connection requests.

IV. TCP/IP FLOW CONTROL

Flow control behavior refers to having end-points adjust their transfer rates in response to congestion indicators or under gateway control. This applies to both inbound and outbound traffic. In the preferred embodiment, the end-points implement TCP/IP.

TCP flow control uses the concept of "window size" to enable a receiver end-point to indicate how much data the source end-point can send in a burst at any given time. To do this, the receiver transmits a window size limit to the source. TCP utilizes timeouts and duplicate acknowledgment signals (ACKs) to initially determine network congestion, and then utilizes the concept of window size as a tool to prevent and respond to the congestion, To do all this accurately and efficiently, TCP uses a half-dozen subtly intertwined algorithms. Congestion control is done reactively and coarsely and typically involves long delays and retransmitted traffic on the network. ACKs are used to avoid overall network collapse.

In an embodiment, a gateway at the route bottleneck (e.g., the Internet access line) is used to invoke this window size flow control mechanism in a proactive manner by screening bandwidth use and updating the sources. Typically, control applies over relatively large time scales (typical Internet round-trip times).

In alternative embodiments of the present invention, ICMP Source Quenching can also be used to serve as a flow control mechanism. ICMP Source Quenching is an IP mechanism typically invoked by routers to indicate buffer overflow. BSD based TCP/IP stacks will effect a sharp backing off of TCP data traffic bursts on receipt of such ICMP packets.

To achieve control over inbound traffic, the present invention invokes flow control at the source to spoof window size packets. This technique is also applied as a high-level control over the outbound fair scheduler in order to control congestion preferably when traffic is not subject to admission control. Further, a fair scheduler for inbound communications is used to identify which classes may need to be controlled at the source.

Figure 5:
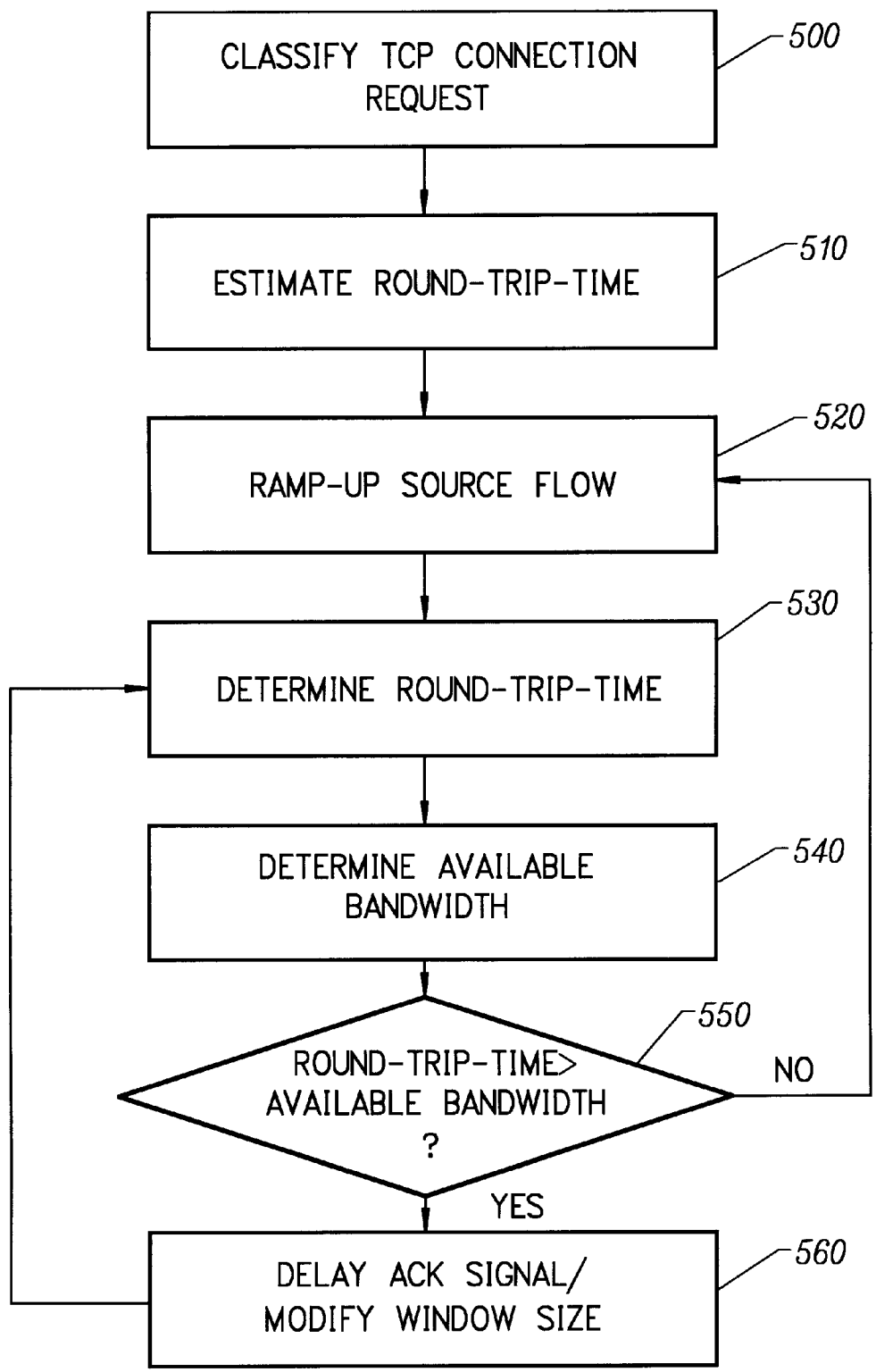
FIG. 5 illustrates a block diagram of a flow chart according to a preferred embodiment.

FIG. 5 illustrates a block diagram of a flow chart according to a preferred embodiment. Initially, a TCP connection request (SYN) is classified into the user-specified class hierarchy, step 500. A connection is fully classified if it can be assigned to a leaf node. The connection is partially classified if it cannot be uniquely assigned to a non-leaf node. A connection may not be fully classified until the arrival of the first request-data packet.

Next, during connection setup, the round-trip-time (RTT) of the connection is estimated, step 510. The RTT is typically not reliably measured during windowed data flow at a gateway without probe packets or routing information. Thus, the present method typically does not depend on accurate measures of RTT but rather is driven by a nominal value from the first estimate.

At any given time, the available response-data bandwidth is partitioned to all existing connections within a class proportionally. The available bandwidth is updated upon each new admitted connection (SYN or SYN&DATA) and each terminated connection (FIN). If there are guaranteed rates for each connection, the system may disallow new connections during request-data phase or allow new connections as a best-effort class.

The source is then allowed to ramp up the source flow according to application requirements and TCP flow control, step 520. This flow is monitored by monitoring ACKs flowing in the return direction. During this phase, the system also estimates the bottleneck link speed for the connection. As a result, the minimum inter-ACK, back-to-back ACKs, or inter-data packet time observed is determined, step 530, which gives a lower bound on link speed. This speed is typically used to adjust and reallocate source bandwidth among sibling connections preferably if the available rate is greater than the link speed.

In a preferred embodiment, on each data ACK, the available response bandwidth and actual utilization over the life of the connection is translated into a limit window size for the next RTT, step 540. In an alternative embodiment, fair queuing at all leaf nodes and the use limiting queue lengths are used to calculate window sizes. A limit window increase is scaled to a multiple of the segment size to emulate receiver silly-window avoidance.

If the connection ramps above the assigned source flow (or the emulated fair queue grows too large), step 550, the window sizes are preferably modified with each response ACK as follows, step 560:

If (wsender>wmax) {w=MAX(wmax, MSS); if (a+w<eprev ) {w=eprev-a} else {eprev=e }; send-ack(a,w)}

Where MSS=Max.segment size; eprev=Window right edge sequence# advertised in previous ACK; wsender=Window advertised by the sender; a=ACK sequence #; wmax= Window size limit; and w=sent window.

The above rate control method is efficient to implement, follows TCP semantics (including silly window avoidance and window updates), and "guarantees" a minimum bandwidth (MSS/RTT) to a connection without use of any timing or queuing mechanisms. The method is extendable to provide arbitrarily small bandwidth limits using a timing or queuing mechanism to send a window update preferably as follows:

If (wmax<MSS) {set_timer(RTT*MSS/wmax)} timer: w=MSS; send_ack(a,w)

The above equations are merely exemplary, it should be understood that many variations in the above equations can be made in light of the teaching above are such variations are contemplated in alternative embodiments of the present invention. In the preferred embodiment, to compensate for the effects of TCP slow-start, a connection sends up to 25% over limit over any RTT.

Figure 6:
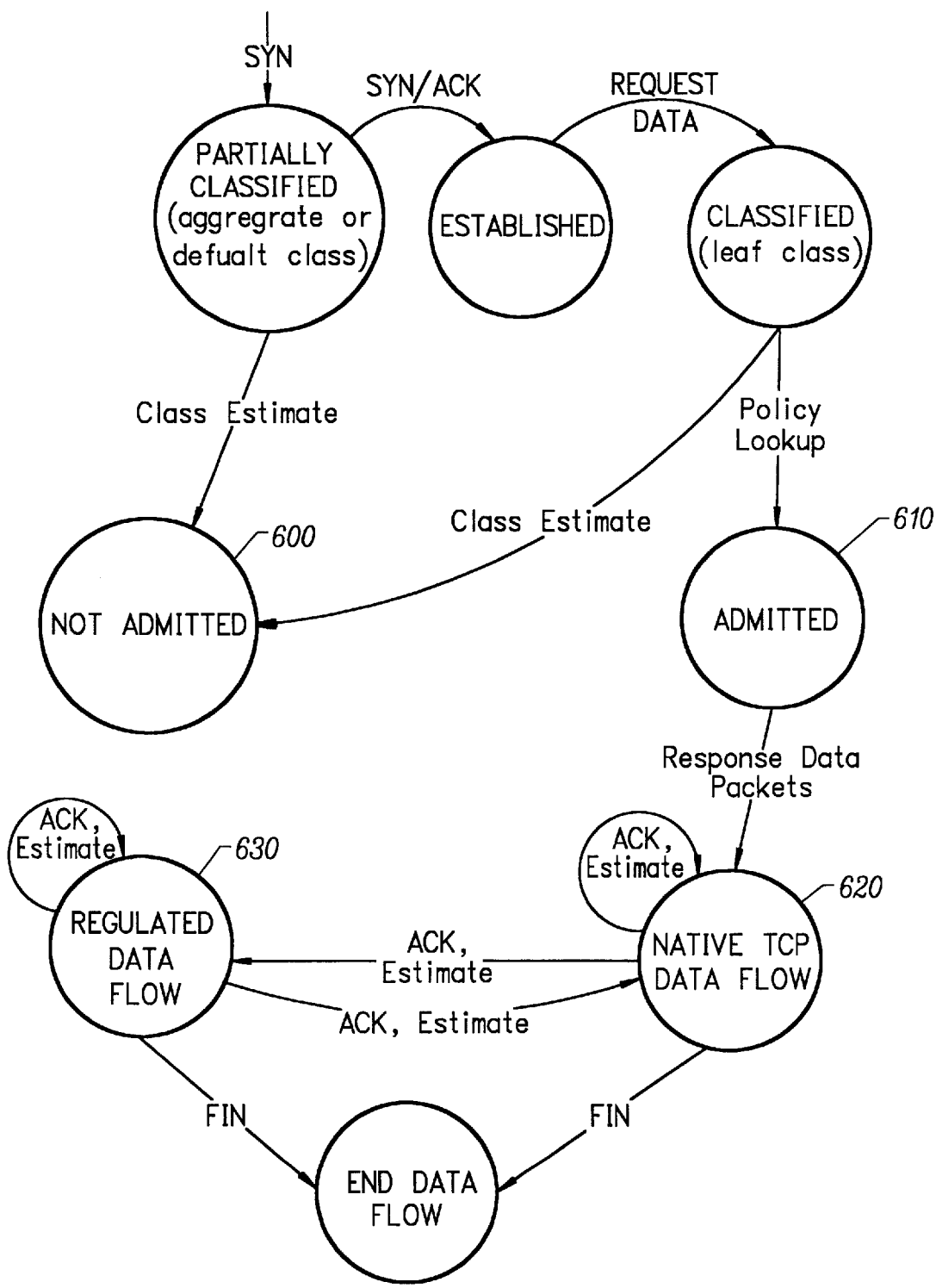
FIG. 6 illustrates a state transition diagram for a preferred embodiment of the present invention.

FIG. 6 illustrates a state transition diagram for a preferred embodiment of the present invention. FIG. 6 illustrates the role of traffic class and policy in the preferred embodiment of the present invention. Typically, when a traffic class for a connection is not recognized, when exception conditions are in place, and other situations, a connection is not admitted, state 600. If a connection is admitted, state 610, data can then begin to flow, state 620.

FIG. 6 further illustrates how typically TCP flow is not inhibited when the round-trip-time does not exceed the flow limits, state 620, and how typical TCP flow is inhibited when the round-trip-time exceeds the flow limits, state 630. In the former case, the ACK signal is typically not inhibited, whereas in the latter case, the ACK signal is inhibited, or delayed.

Figure 7:
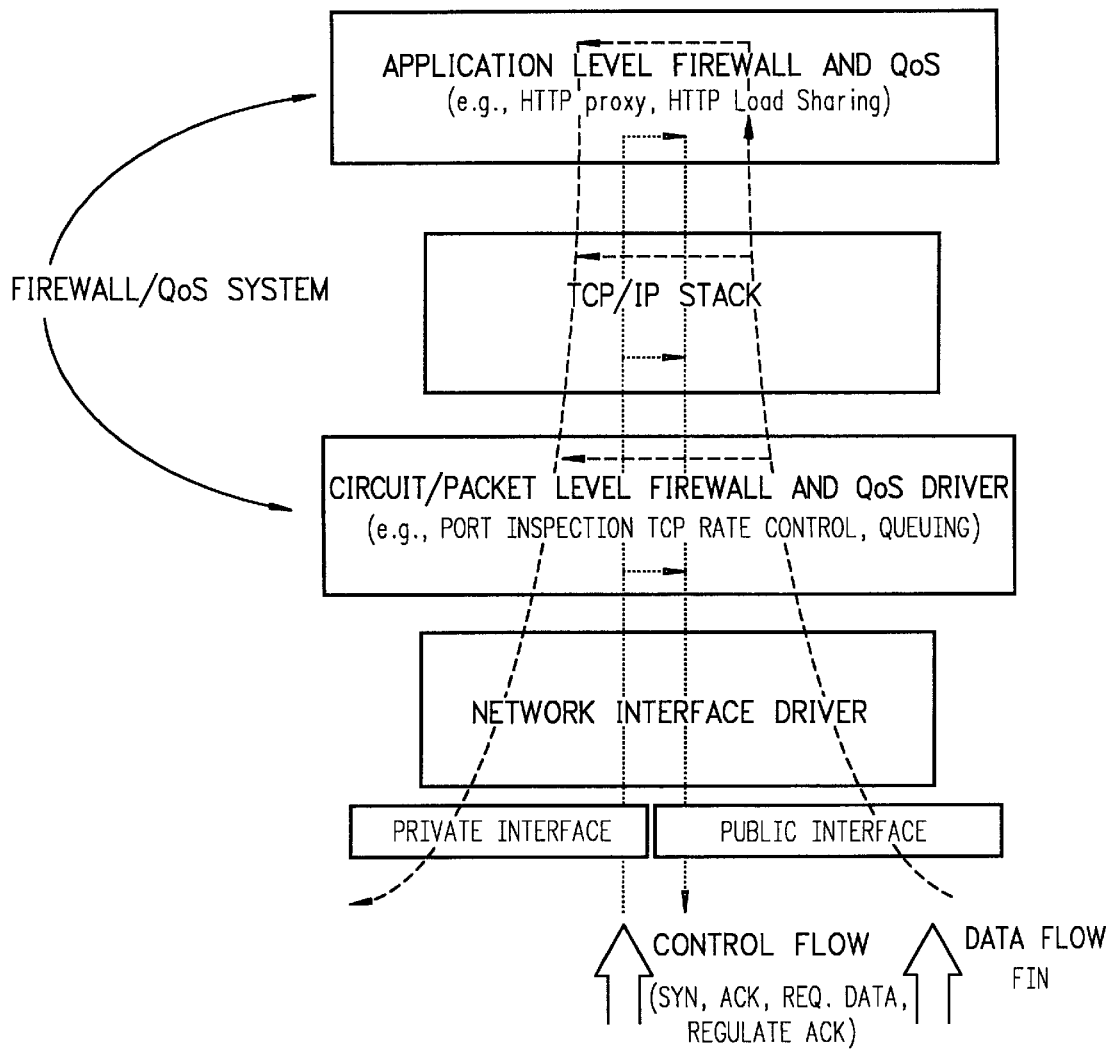
FIG. 7 illustrates an implementation architecture of a preferred embodiment of the present invention.

FIG. 7 illustrates an implementation architecture of a preferred embodiment of the present invention. Other embodiments of the present invention may be applied with other techniques for QOS or bandwidth management.

V. APPLICATIONS

The embodiments described above are preferably used to address current and future technological changes and requirements.

For example, the embodiments of the present invention provide resource management for ever increasing traffic, i.e. scalability. Scaling refers to the growing (and often indeterminate) body of users having widely varying access speeds that compete for the same resources, for example bandwidth. Scaling is adversely affected by the growing volume of available content (e.g. HTML pages), by the falling costs of CPUs, and trends towards network computers. By providing QoS management, as described above, management of increasingly scarce resources (bandwidth) is facilitated.

Further, the embodiments of the present invention provide resource management to respond to Business priorities. Business use of the Internet typically ranges from casual use to business critical use. As secure Internet business applications continue to develop, providing service quality for these core business functions over casual use will be a high priority (e.g., the quality of external access of a customer to an order entry web page. By providing QoS management as described above, Business-oriented or other priority traffic is facilitated.

Also the embodiments of the present invention provide resource management to respond to different traffic types. As different types of content application increase and standards continue to emerge and evolve, different types of Internet traffic may require specific service guarantee. For example, different applications may require different bandwidth, e.g. intensive, real-time, interactive, and the like. By providing QoS management as described above, bandwidth critical traffic is facilitated.

The embodiments of the present invention described above preferably provide a symmetrical, solution for gateway control of inbound and outbound traffic over the Internet, with the basic methods (queuing and source TCP rate control) designed to complement each other.

VI. DIRECTORY SERVICES

Figure 8:
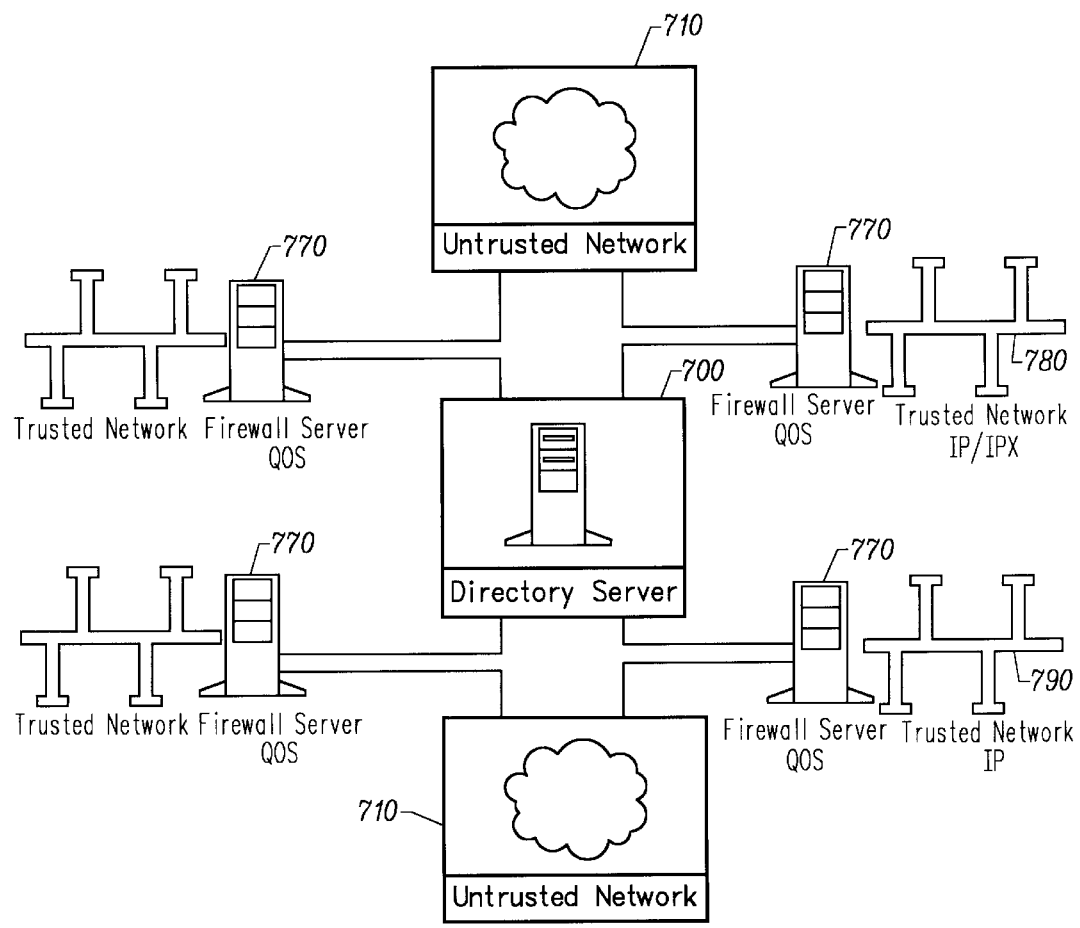
FIG. 8 illustrates a more detailed embodiment of the present invention.

FIG. 8 illustrates a more detailed embodiment of the present invention. FIG. 8 includes a number of firewall/ quality of service (QOS) servers 770, each preferably coupled to at least one respective trusted network. The trusted networks include IPX based networks 780, and IP based networks 790. A directory services (DS) server 700, and a plurality of untrusted networks 710 are also illustrated.

As shown in FIG. 8, the trusted networks, including IPX based network 780 and IP based network 790 preferably communicate with untrusted networks 710 and each other through respective firewall/QOS servers 700. Typical firewall/QOS servers are based upon servers having operating systems such as WindowsNT from Microsoft Corporation, NetWare or Intranet Ware from Novell Corporation, proprietary hardware boxes, and the like. Other types of platforms, such as UNIX, and others are used in alternative embodiments of the present invention.

In the present embodiment firewall/QOS servers 770 are provided with quality of service management features described above and in co-pending application Ser. No. 60/067,857, entitled: Bandwidth Management System and Method, filed Dec. 5, 1997, attorney docket no. 18430-000300 and in co-pending application Ser. No. 60/047,752, entitled: Method and Apparatus for Configuring and Managing Firewalls, filed May 27, 1997, attorney docket no. 18430-000200. Further, firewall/QOS servers 770 are typically provided with firewall management features described in co-pending application Ser. No. 08/998,100, entitled: Method and Apparatus for Configuring and Managing Firewalls and Security Device, filed Dec. 24, 1997, attorney docket no. 18430-000110, although other firewall features are also contemplated. These applications are herein by incorporated by reference for all purposes.

The embodiment illustrated in FIG. 8 represents a network of trusted networks representative of a typical configuration. As shown in detail in FIG. 8, DS server 700 is preferably coupled to the trusted networks by, among other possible configurations, firewall/QOS servers 770. DS server 700 typically embodies directory access services such as Novell Directory Services, LDAP, X.500, ADS, and others. Firewall/QOS servers 770 are typically also compatible with the selected directory services. Further information regarding Novell Directory Services (NDS) can be found in documents at the following web site www.novell.com/products/nds/wpnds.html. The documents are incorporated by reference for all purposes.

DS server 700 enables the management of firewall/QOS servers 770 from a central administration point. Thus, from the central administration point the user can configure or reconfigure each firewall/QOS server 770. For example the configuration of firewall capabilities within the network can be managed and set by single administrator via the directory services. Further, the QOS capabilities of the trusted networks can also be managed from a single administrator via the directory services. For example, as discussed above and in the referenced applications, QOS parameters can include determination and classification of traffic classes and entities, the determination and configuration of traffic policies, the determination and configuration of traffic rules, and the like. Further the directory services provides back-up or redundant QOS and/or firewall configuration, data, and the like which may be referenced if the information stored within a local firewall/QOS server is compromised or requires updating.

By providing a single point of administration for multiple Quality of Service servers, a coherent and uniform quality of service policy can be implemented. Alternatively, a single point of administration provides the determination of quality of service to be determined for multiple QOS servers, although the particular configuration for specific servers may be different. Further, by providing this capability, changes to the QOS classes, policies, rules, and the like can be made in a timely fashion. As opposed to logging into each firewall/QOS server 770 and modifying the configuration information individually, the user logs into one machine, such as DS Server 700 or remotely into DS Server 700, to modify the selected parameters.

Figure 9A:
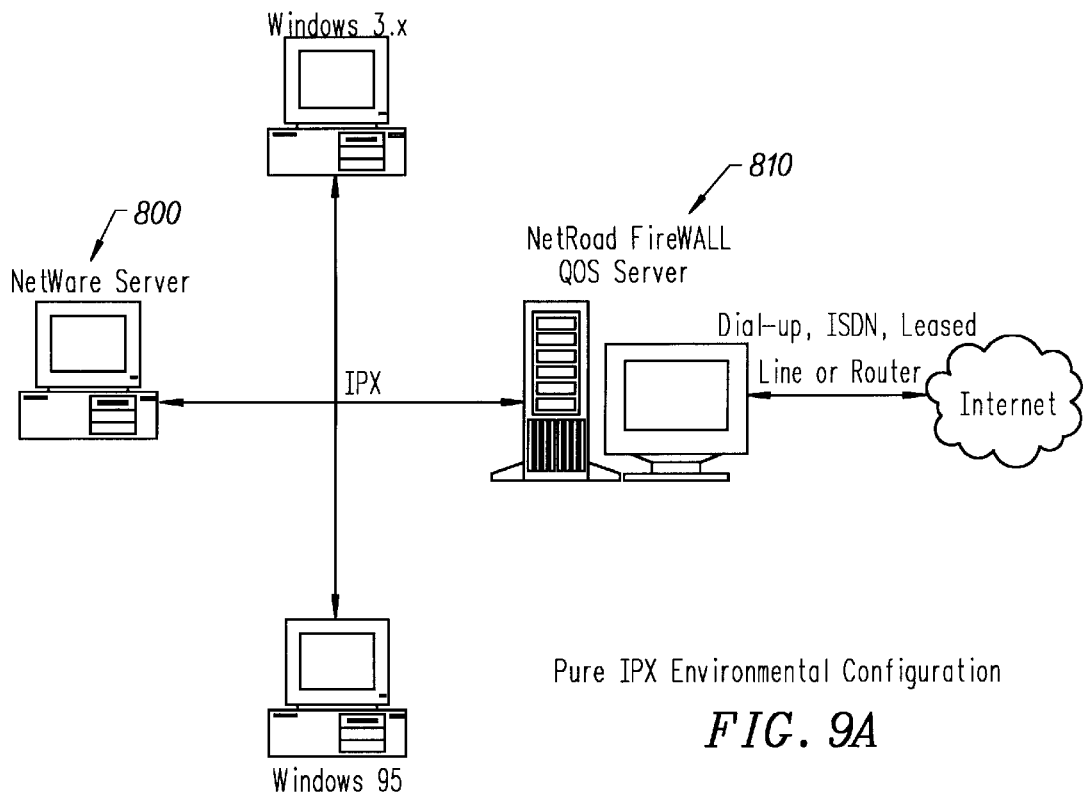
FIGS. 9a–c illustrate typical firewall/QOS system configurations for embodiments of the present invention.
Figure 9B:
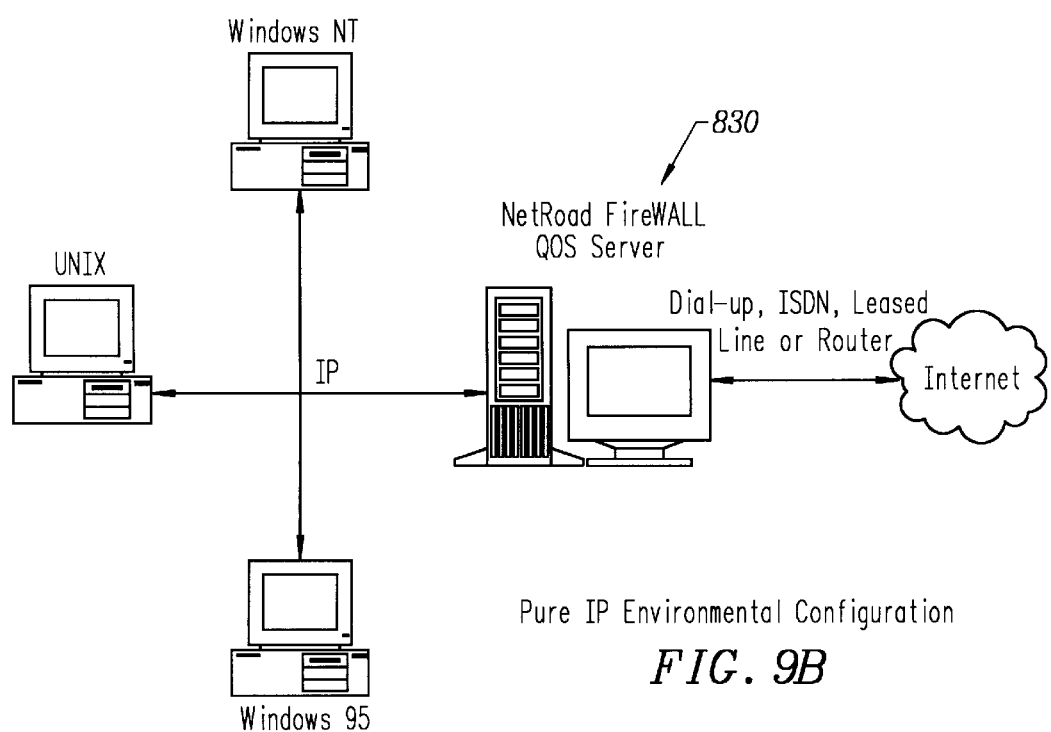
Figure 9C:
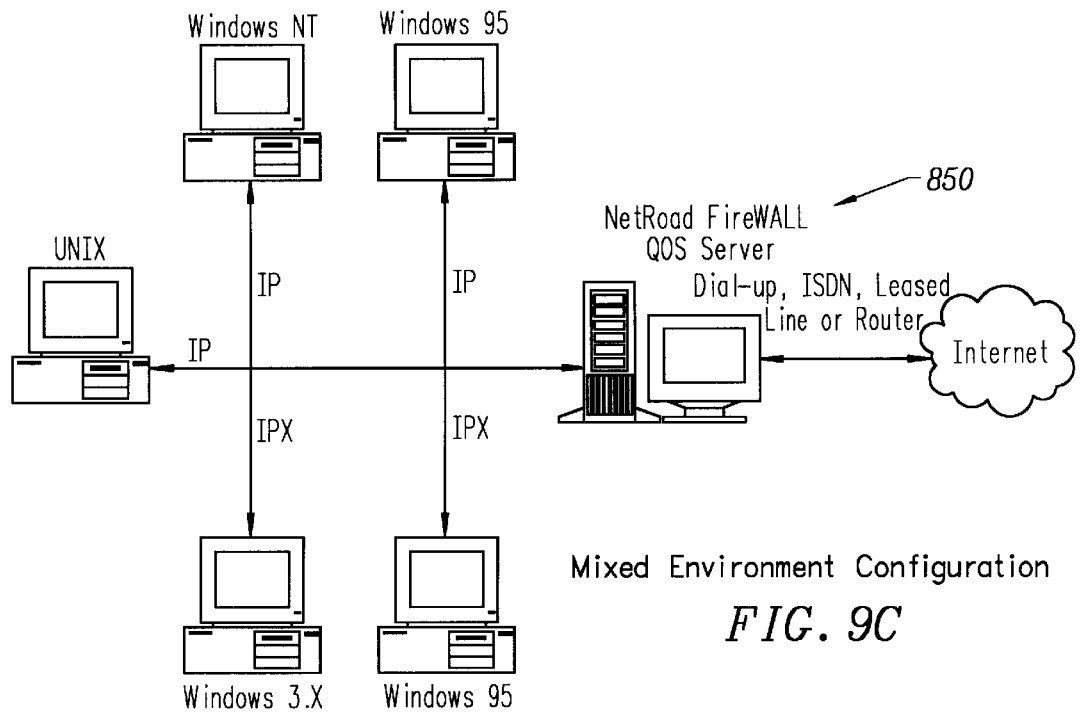

FIGS. 9a–c illustrate typical firewall/QOS system configurations for embodiments of the present invention. FIG. 9a illustrates the system configured for a pure IPX network; FIG. 9b illustrates the system configured for a pure IP network; and FIG. 9c illustrates the system configured for a mixed IP/IPX network. FIG. 9a includes a network server 800 and a firewall/QOS server 810; FIG. 9b includes a firewall/QOS server 830; and FIG. 9c includes a firewall server 850.

In the embodiment in FIG. 9a, network server 800 operates in a pure IPX network and is typically based upon Novell NetWare Server software, In this configuration, firewall/QOS server 810 independently provides the firewall, security, and QOS services and also preferably provides IPX/IP gateway services to the Internet.

In one embodiment of the present invention, firewall server 810 and network server 800 are implemented on physically distinct computer systems. Alternatively, firewall/QOS server 810 and network server 800 are implemented upon the same physical computer system, and Netware Server provides the IPX/IP gateway services.

In the embodiment in FIG. 9b, a network server for a pure IP network may be based upon UNIX, WindowsNT, Windows95 servers, and the like. In this configuration, firewall server 830 provides the firewall, security and other QOS services, but typically without the IPX/IP gateway services.

In the embodiment in FIG. 9c, a mixed protocol network may be based upon both IPX and IP protocols, as illustrated. In this configuration, firewall/QOS server 850 provides the firewall, other security services, QOS services, and preferably provides the IPX/IP gateway services for IPX transmission packets as needed.

Figure 10:
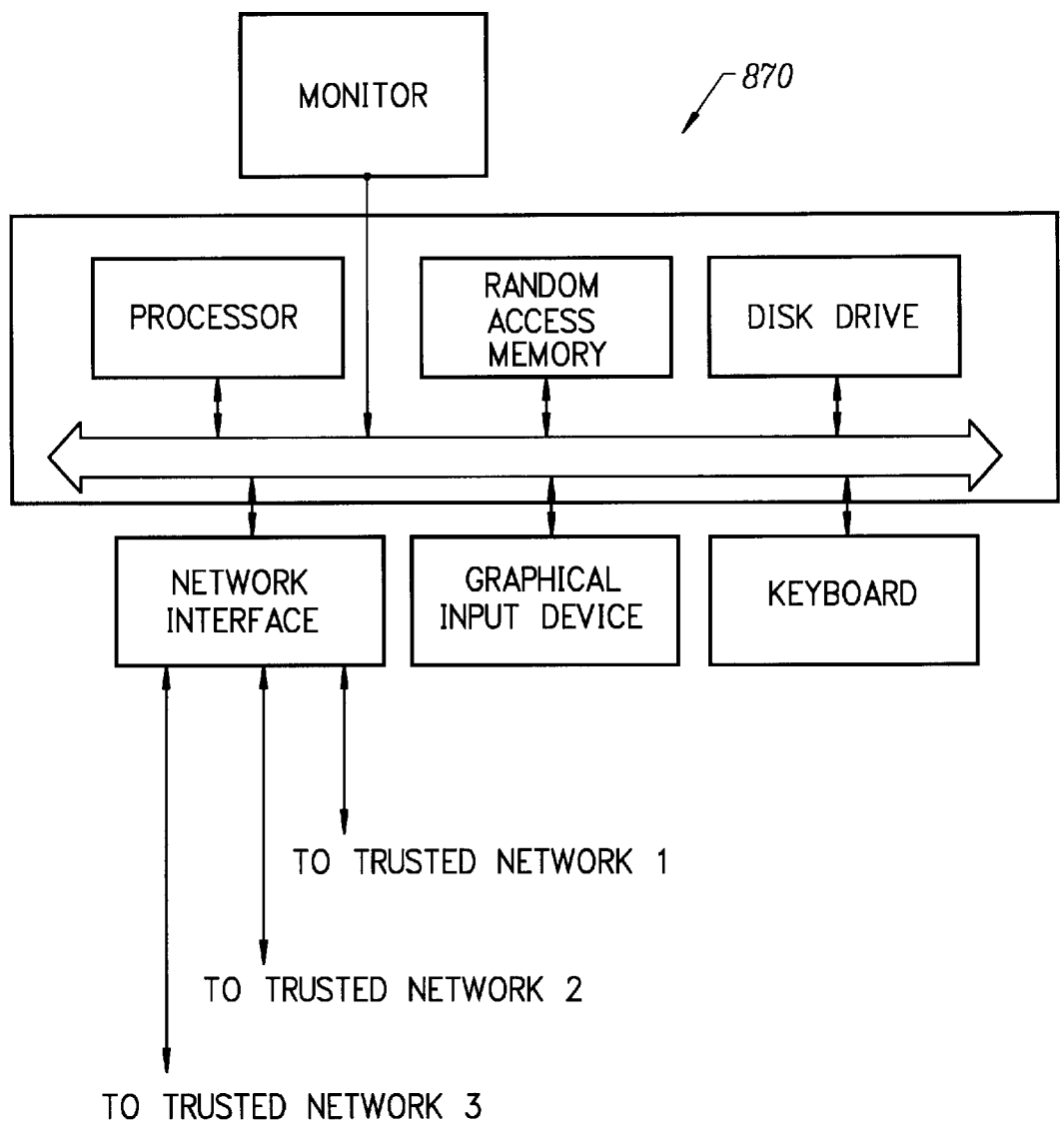
FIG. 10 is a block diagram of a system 870 for a directory services server according to an embodiment of the present invention.

FIG. 10 is a block diagram of a system 870 for a directory services server according to an embodiment of the present invention. System 870 preferably includes many of the same computer hardware and software components described above for FIG. 2.

In FIG. 10, it is preferred that the network interface unit 340 is coupled to internal networks to provide Directory Services between those internal networks. As an example, as illustrated in FIG. 8, DS server 700 is coupled to the trusted networks through firewall/QOS servers 770 and provides directory access to and from trusted network 780 to trusted network 790 that is transparent to the user.

To provide cross network directory services, it is preferred that each internal network conform with the same directory services protocol. Several of these protocols were mentioned above (Novell Directory Services, LDAP, and the like.) System 870 thus preferably manages directory services requests between internal networks, and from a central administration point to the internal networks, according to the chosen directory services protocol. Further, in one particular embodiment, System 870 preferably manages requests to modify configuration files within firewalls, security features, and QOS configuration of the attached trusted networks.

FIG. 10 is representative of but one type of system for embodying the present invention. It will be readily apparent to one of ordinary skill in the art that many system types and configurations are suitable for use in conjunction with the preferred embodiment of the present invention.

It should be understood that coupling of system 870 to the trusted networks need not be a direct connection. As illustrated in the embodiment in FIG. 8, the coupling is performed via firewall/QOS servers 770. Further, it is envisioned that trusted networks may be coupled to system 870 by virtual private networks, or similar system, via a trusted or an untrusted network such as the Internet, or any combination of the above connections, and the like.

In the embodiment illustrated in FIG. 8, DS server 700 provides a central database (a directory services database) that stores configuration information of internal networks such as IPX based networks 780 and IP based networks 790, including in the present embodiment, QOS configuration information.

Figure 11A:
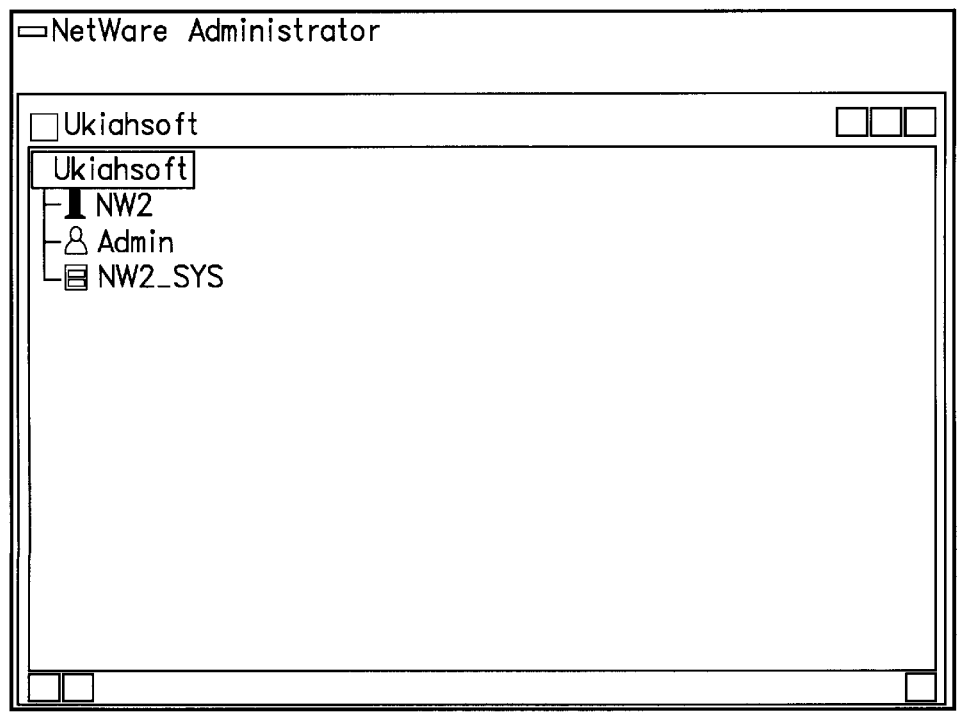
FIGS. 11a–c illustrate installation of QOS configuration information according to an embodiment of the present invention.
Figure 11B:
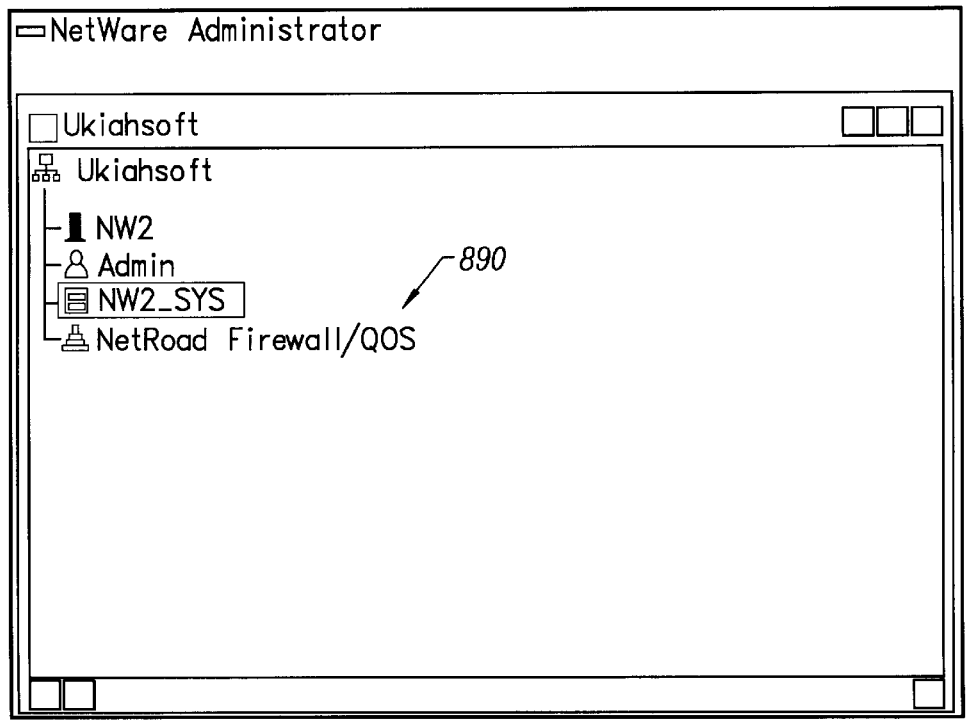
Figure 11C:
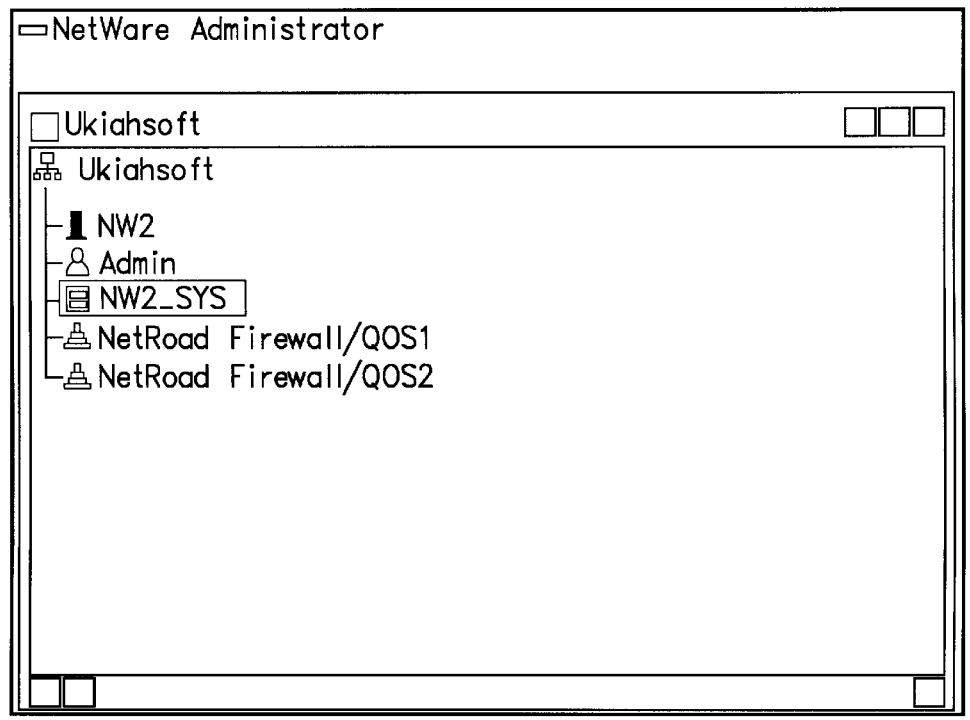

FIGS. 11a–c illustrate installation of QOS configuration information according to an embodiment of the present invention. In particular, FIGS. 11a–c illustrate an embodiment implemented using Novell Directory Services. Other directory services standards or protocols may alternatively be used in other embodiments.

In order to integrate QOS configuration capability to the Novell Directory Services, a configuration administration tool is implemented as a NetWare Administrator software (NWADMIN) "snap-in." The installation of this snap-in extends the Novell Directory Services schema by adding a firewall/QOS class and associated attributes. The associated attributes include QOS configuration parameters such Classes, Entities, Policies, Rules, and the like are thus preferably administered and enforced through the Directory Services administration software.

FIG. 11b illustrates the extension of the Novell Directory Services to include a class of security devices, namely firewall/QOS 980. FIG. 11b illustrates the extension of a Directory Services with a single firewall/QOS, in a configuration such as illustrated in FIG. 8; FIG. 11c illustrates the extension of a Directory Services with multiple firewall/QOS servers. Administration of one or more firewall/QOS servers from a single administration point is thus provided with a typical graphical user interface as shown.

CONCLUSION

In the foregoing specification, the invention has been described with reference to specific exemplary embodiments thereof. Many changes or modifications are readily envisioned. For example, the present invention can be applied to manage a variety of TCP/IP network traffic types for the Internet and Intranet. Further, the techniques can also be applied to Novell SPX, Xerox XNS or any protocol with a similar 'flow-control' design that utilizes windows and acknowledgment signals (similar to ACK).

Alternative embodiments of the present invention can also be applied to a 'legacy' private WAN running IP as well as native Novell protocols if there is a need. (e.g., file server and client/server traffic). Further, embodiments of the present invention can include monitoring, billing, and reporting features, thus allowing for enhanced client billing and internal cost accounting of network usage.

These techniques are preferably implemented within a firewall platform to solve the provide the following benefits: bidirectional bandwidth management of network links carrying TCP traffic; reactive (short-time scale) and proactive (long time scale) control mechanisms; and gateway (local) and end-end (global) techniques for bandwidth control. This solution reduces their contribution to congestion in the Internet; and operation in a present day heterogeneous wide area networks, such as the Internet, without requiring any client, server or router changes.

The embodiments described above describe the integration of QOS with a firewall server. In alternative embodiments of the present invention, a QOS server need not be integrated into a firewall but may be a stand-alone server based upon software running on a general purpose computer, or a combination of software running upon a general purpose computer with custom application hardware. In any of the embodiments described, Directory Services may provide support for centralized administration of QOS servers in whatever specific form.

Many changes or modifications are readily envisioned. For example, it is envisioned that different directory services protocols or standards can be used such as LDAP, X500, AD (Active Directory), and the like in alternative embodiments of the present invention. Further, it is envisioned that firewall/QOS servers and other security devices may be implemented on different operating system platforms than WindowsNT, NetWare, IntranetWare, UNIX platforms, and the like such as MacOS or even proprietary hardware based firewall solutions. Still further, it is envisioned that in the future, other network protocols other than IP and IPX clients may be used in other embodiments.

The specification has been extensively described with regards to firewalls and QOS servers, however it should be understood that firewalls are merely a common term for a class or type of network access or security devices. Thus embodiments of the present invention can be used with other network security devices, Further, a firewall may have capabilities extending outside the reach of traditional firewalls, for example incorporating quality of service monitoring and metering capability. Still further, the present invention may be applied to security devices that include firewall capabilities although not specifically called firewalls.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for configuring a plurality of network quality of service devices, comprising:

coupling each network quality of service device of the plurality of network quality of service devices to a network and a network server the network quality of service device providing quality of service management services for the network coupled to the network quality of service device;

providing a network directory services server coupled to the plurality of network quality of service devices, the network directory services server providing network directory services to the network servers coupled to the plurality of network quality of service devices;

implementing a quality of service policy for the plurality of network quality of service devices on the network directory services server; and using the network directory services to provide configuration information for the plurality of network quality of service devices, in response to the quality of service policy.

2. The method of claim 1 wherein configuration information for a first network quality of service device and a second network quality of service device are substantially similar.

3. The method of claim 1 wherein configuration information for a first network quality of service device and a second network quality of service device are different.

4. The method of claim 2 wherein the first network quality of service device is based upon a WindowsNT operating system and the second network quality of service device is based upon a operating system selected from a class comprising Novell NetWare, Novell IntranetWare, and UNIX.

5. The method of claim 3 wherein a network server coupled to the first network quality of service device is based upon a WindowsNT operating system and a network server coupled to the second network quality of service device is based upon an operating system selected from a class comprising of Novell NetWare, Novell IntranetWare, and UNIX.

6. The method of claim 1 wherein the network directory services is selected from a class comprising Novell Directory Services, Light weight Directory Access Protocol, and Microsoft Active Directory Services.

7. The method of claim 1 wherein the network directory services is Novell Directory Services.

8. The method of claim 1 wherein one of the plurality of network quality of service devices comprises a firewall.

9. A method for bandwidth management in a plurality of networks comprising:
   providing a plurality of bandwidth management servers coupled to a plurality of networks, each bandwidth management server of the plurality of bandwidth management servers providing bandwidth management for the network coupled to the bandwidth management server;
   providing a central network server coupled to the plurality of bandwidth management servers and the plurality of networks, the central network server providing directory services to the plurality of networks;
   configuring bandwidth management features for the plurality of networks within the central network server via a remote client; and
   using the directory services provided by the central network server to provide the bandwidth management features to the plurality of bandwidth management servers.

10. The method of claim 9 wherein each of the plurality of networks are compliant to the directory services.

11. The method of claim 9 wherein bandwidth management features of a first network from the plurality of networks and bandwidth management features of a second network from the plurality of networks are different.

12. The method of claim 11 wherein the bandwidth management server coupled with the first network is based upon a Novell NetWare operating system, and the bandwidth management server coupled with the second network is based upon an operating system selected from the class comprising WindowsNT, Novell NetWare, Novell IntranetWare, and UNIX.

13. The method of claim 9 wherein the directory services is selected from a class comprising Novell Directory Services, Lightweight Directory Access Protocol, and Microsoft Active Directory Services.

14. The method of claim 9 wherein one of the plurality of networks includes a firewall server and wherein bandwidth management features of the one network comprises firewall configuration data.

15. In a network of trusted network servers providing quality of service management services to a plurality of networks, a central computer system coupled to the network of trusted network servers and configured to provide quality of service features for the network of trusted network servers, the computer system including:
   a processor; and
   a computer readable media including:
      code that directs the processor to provide directory services to the network of trusted network servers;
      code that directs the processor to receive quality of service configuration data for the network of trusted network servers from a remote client; and
      code that directs the processor to use the directory services to provide each trusted network server of the network of trusted network servers with the quality of service configuration data.

16. The network of claim 15 wherein each trusted network server of the network of trusted network servers is compatible to the directory services.

17. The network of claim 15 wherein quality of service configuration data of a first trusted network server from the network of trusted network servers and quality of service configuration data of a second trusted network server from the network of trusted network servers are different.

18. The network of claim 17 wherein the first trusted network server is based upon a Novell IntranetWare operating system, and the second trusted network server is based upon an operating system selected from the class comprising WindowsNT, Novell NetWare, Novell IntranetWare, and UNIX.

19. The network of claim 17 wherein the directory services is selected from a class comprising Novell Directory Services, Lightweight Directory Access Protocol, and Microsoft Active Directory Services.

20. The network of claim 15 wherein quality of service features of one of the network of trusted network servers comprises firewall features.

* * * * *